US012046931B2

(12) United States Patent
Salter et al.

(10) Patent No.: US 12,046,931 B2
(45) Date of Patent: Jul. 23, 2024

(54) VEHICLE ELECTRICAL SYSTEM

(71) Applicant: Ford Global Technologies, LLC, Dearborn, MI (US)

(72) Inventors: Stuart C. Salter, White Lake, MI (US); Todd Ansbacher, Westland, MI (US); Anthony Thomas Spoto, Birmingham, MI (US); Hanyang Chen, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 519 days.

(21) Appl. No.: 17/392,597

(22) Filed: Aug. 3, 2021

(65) Prior Publication Data

US 2023/0044009 A1 Feb. 9, 2023

(51) Int. Cl.
*H02J 7/00* (2006.01)
*B60L 8/00* (2006.01)
*H02S 20/30* (2014.01)
*H02S 40/38* (2014.01)

(52) U.S. Cl.
CPC ............ *H02J 7/0024* (2013.01); *B60L 8/003* (2013.01); *H02J 7/0019* (2013.01); *H02S 20/30* (2014.12); *H02S 40/38* (2014.12)

(58) Field of Classification Search
USPC ........................................................ 320/117
See application file for complete search history.

(56) References Cited

U.S. PATENT DOCUMENTS

| 5,767,658 | A | 6/1998 | Hayes |
| 6,545,445 | B1 | 4/2003 | McDermott et al. |
| 6,583,599 | B1 | 6/2003 | Phillips et al. |
| 7,151,326 | B2 | 12/2006 | Jordan |
| 9,452,720 | B2 | 9/2016 | Brey |
| 10,168,364 | B2 | 1/2019 | Chakrabarty |
| 10,879,710 | B2 | 12/2020 | Park |
| 2006/0058897 | A1 | 3/2006 | Senda et al. |
| 2006/0132141 | A1 | 6/2006 | Dougherty et al. |
| 2008/0100258 | A1* | 5/2008 | Ward ................ H01M 10/465 320/101 |

(Continued)

FOREIGN PATENT DOCUMENTS

CN 112072700 A 12/2020
DE 102016207033 A1 10/2017

(Continued)

OTHER PUBLICATIONS

Non-Final Office Action dated Jan. 18, 2024 re U.S. Appl. No. 17/467,609, filed Sep. 7, 2021.

(Continued)

*Primary Examiner* — Mohammed Alam
(74) *Attorney, Agent, or Firm* — Frank Lollo; Bejin Bieneman PLC

(57) ABSTRACT

A vehicle electrical system includes a battery, a customer connection point, a switch electrically connected in series between the battery and the customer connection point, a solar panel electrically connected to a node between the battery and the switch, and a computer communicatively coupled to the switch. The computer is programmed to instruct the switch to close upon determining that a voltage of the solar panel is greater than a voltage of the battery.

20 Claims, 6 Drawing Sheets

(56) References Cited

U.S. PATENT DOCUMENTS

| | | | |
|---|---|---|---|
| 2008/0143292 A1* | 6/2008 | Ward | B60L 8/003 |
| | | | 320/101 |
| 2011/0221384 A1* | 9/2011 | Scheucher | B60W 50/082 |
| | | | 324/427 |
| 2011/0248667 A1* | 10/2011 | Umeoka | B60K 16/00 |
| | | | 320/101 |
| 2012/0176096 A1 | 7/2012 | Mumelter et al. | |
| 2012/0306266 A1 | 12/2012 | Ohnuki | |
| 2013/0193753 A1 | 8/2013 | Brey | |
| 2014/0225620 A1 | 8/2014 | Campbell et al. | |
| 2015/0244165 A1 | 8/2015 | Roesner et al. | |
| 2017/0106819 A1 | 4/2017 | Richardson et al. | |
| 2017/0356963 A1 | 12/2017 | Petrucelli | |
| 2018/0238289 A1 | 8/2018 | Khonizi | |
| 2018/0297476 A1* | 10/2018 | Malek | B60L 1/003 |
| 2019/0249635 A1 | 8/2019 | Khafagy et al. | |
| 2020/0114764 A1 | 4/2020 | Johnson | |
| 2021/0162867 A1* | 6/2021 | Clay | H01M 16/00 |
| 2023/0044009 A1* | 2/2023 | Salter | H02S 20/30 |

FOREIGN PATENT DOCUMENTS

| | | | |
|---|---|---|---|
| JP | 201667142 A | 4/2016 | |
| JP | 6730167 B2 | 7/2020 | |

OTHER PUBLICATIONS

Non-Final Office Action dated Jul. 18, 2023 re U.S. Appl. No. 17/467,609, filed Sep. 7, 2021.

Non-Final Office Action dated Feb. 27, 2023 re U.S. Appl. No. 17/467,609, filed Sep. 7, 2021.

* cited by examiner

VEHICLE ELECTRICAL SYSTEM

BACKGROUND

Motor vehicles typically include at least one battery. Types of batteries include lithium-ion batteries, nickel-metal hydride batteries, and lead-acid batteries. The battery is used to start the motor of the vehicle. When the operator turns the ignition, current from the battery is provided to a solenoid switch causing the solenoid switch to close and electrically connect the battery to a starter. The starter converts the electrical energy from the battery into rotational kinetic energy to start the motor.

DETAILED DESCRIPTION

Figure 1:
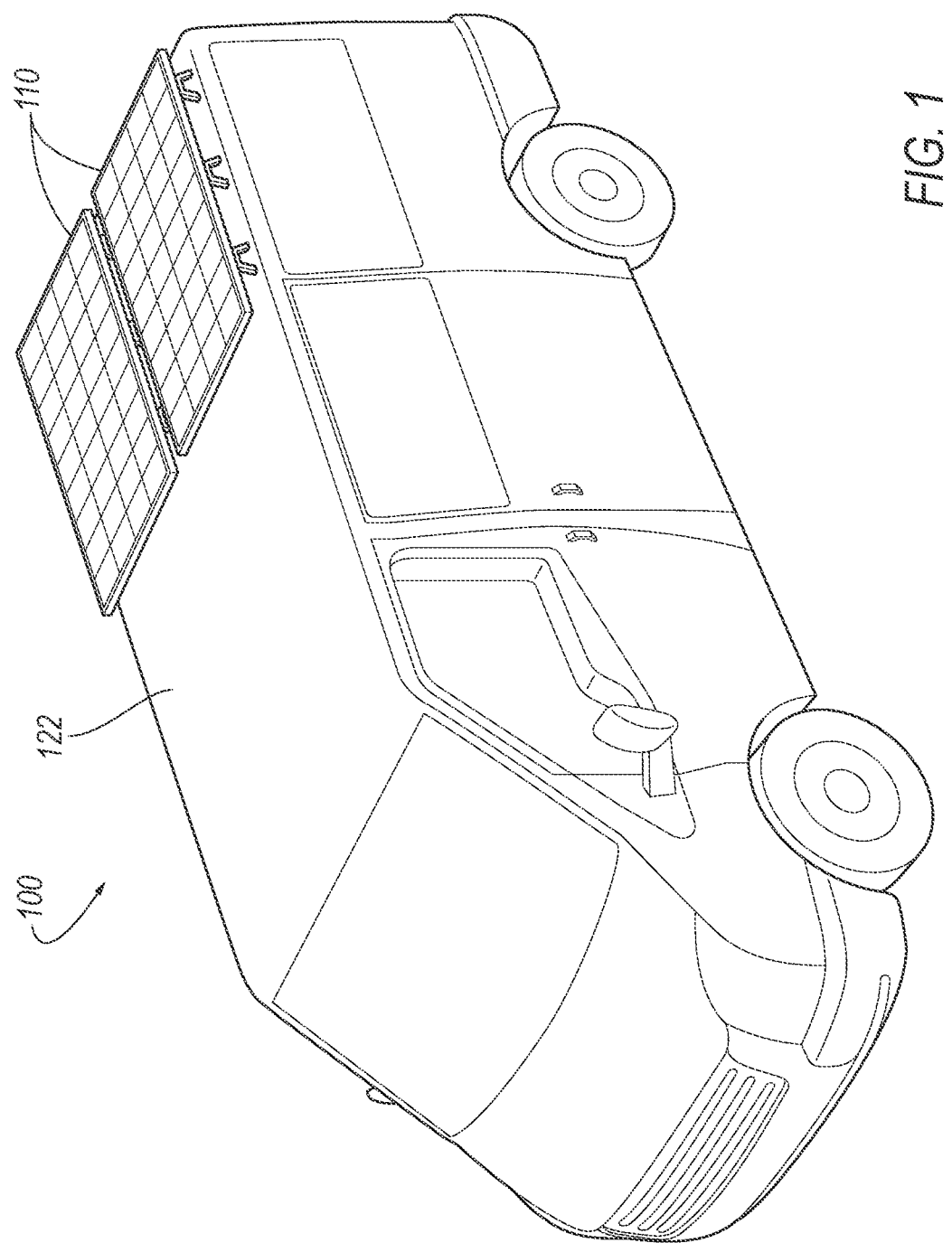
FIG. 1 is a perspective view of an example vehicle.

A vehicle electrical system includes a battery, a customer connection point, a switch electrically connected in series between the battery and the customer connection point, a solar panel electrically connected to a node between the battery and the switch, and a computer communicatively coupled to the switch. The computer is programmed to instruct the switch to close upon determining that a voltage of the solar panel is greater than a voltage of the battery.

The battery may be a second battery, the switch may be a second switch, the vehicle electrical system may further include a first battery and a first switch electrically connected in series between the first battery and the second battery. The computer may be further programmed to instruct the first switch to close upon determining that the voltage of the second battery is less than a voltage of the first battery.

The computer may be further programmed to instruct the first switch to open upon determining that the voltage of the second battery is at least equal to a voltage of the first battery.

The first switch may be electrically connected in series between the first battery and the second switch.

The vehicle electrical system may further include an ignition electrically connected to the first battery, and the first battery may be configured to supply power to a starter in response to a signal from the ignition.

The vehicle electrical system may further include a third switch, and the third switch may be a double-throw switch switchable among (1) closed to the first battery, (2) closed to the customer connection point, and (3) open. The computer may be further programmed to instruct the third switch to close to the customer connection point upon determining that the voltage of the solar panel is greater than the voltage of the second battery.

The computer may be further programmed to instruct the third switch to close to the first battery upon determining that a state of charge of the first battery is less than fully charged.

The computer may be further programmed to instruct the third switch to open upon determining both that the voltage of the solar panel is less than the voltage of the second battery and that the state of charge of the first battery is fully charged.

The computer may be further programmed to instruct the switch to close upon determining that a state of charge of the battery is above a charge threshold.

The computer may be further programmed to instruct the switch to open upon determining that a state of charge of the battery is below a charge threshold.

The computer may be further programmed to instruct the switch to open upon determining both that the voltage of the solar panel is greater than the voltage of the battery and that a state of charge of the battery is below a charge threshold.

The vehicle electrical system may further include a plurality of customer connection points including the customer connection point, and the switch may be electrically connected in series between the battery and the plurality of customer connection points. The computer may be further programmed to receive an input selecting a target time, select a subset of a plurality of loads electrically coupled to the customer connection points upon predicting that the battery will discharge to a charge threshold before the target time, and then transmit instructions to the subset of the loads to shut down. Selecting the subset of the loads may be based on a prioritization of the loads received as an input.

Selecting the subset of the loads may be based on power-consumption data received from the loads. The vehicle electrical system may further include a wireless transceiver communicatively coupled to the computer, and the computer may be further programmed to receive the power-consumption data from the loads via the wireless transceiver.

The power-consumption data may include individual rates of power consumption of the loads.

The vehicle electrical system may further include a transceiver communicatively coupled to the computer, and the computer may be further programmed to instruct the transceiver to transmit a message to a remote server upon predicting that the battery will discharge to the charge threshold before the target time.

With reference to the Figures, wherein like numerals indicate like parts throughout the several views, a vehicle electrical system 102 for a vehicle 100 includes a second battery 104, at least one customer connection point 106, a second switch 108 electrically connected in series between the second battery 104 and the at least one customer connection point 106, a solar panel 110 electrically connected to a second node 112 between the second battery 104 and the second switch 108, and a computer 114 communicatively coupled to the second switch 108. The computer 114 is programmed to instruct the second switch 108 to close upon determining that a voltage of the solar panel 110 is greater than a voltage of the second battery 104.

The customer connection points 106 permit an operator to connect nonvehicle loads 146 to the vehicle electrical system 102. The second battery 104 provides power to the nonvehicle loads 146 even when an ignition 116 of the vehicle 100 is off. (As described below, the vehicle 100 can include a first battery 118 separated from the second battery 104 by a first switch 120, and the first battery 118 can be used to start the vehicle 100.) The computer 114 can disconnect the second switch 108 to isolate the nonvehicle loads 146 from the second battery 104 when the solar panel 110 can provide as much power to the nonvehicle loads 146 than the second battery 104 can. Otherwise, the second battery 104 can power the nonvehicle loads 146 while the solar panel 110 can provide charging to the second battery 104.

With reference to FIG. 1, the vehicle 100 may be any suitable type of ground vehicle, e.g., a passenger or commercial automobile such as a sedan, a coupe, a truck, a sport utility, a crossover, a van, a minivan, a taxi, a bus, etc.

The vehicle 100 includes the solar panel 110. The solar panel 110 is mounted to the vehicle 100 on an exterior of the vehicle 100. The solar panel 110 is positioned to receive sunlight, e.g., on a roof 122 of the vehicle 100.

The solar panel 110 converts energy in sunlight to electricity, e.g., to direct current. For example, the solar panel 110 can be a collection of photovoltaic cells. The solar panel 110 can be any suitable type for charging the first battery 118 or second battery 104 or supplying electricity to nonvehicle loads 146, e.g., crystalline silicon, thin film, etc.

Figure 2:
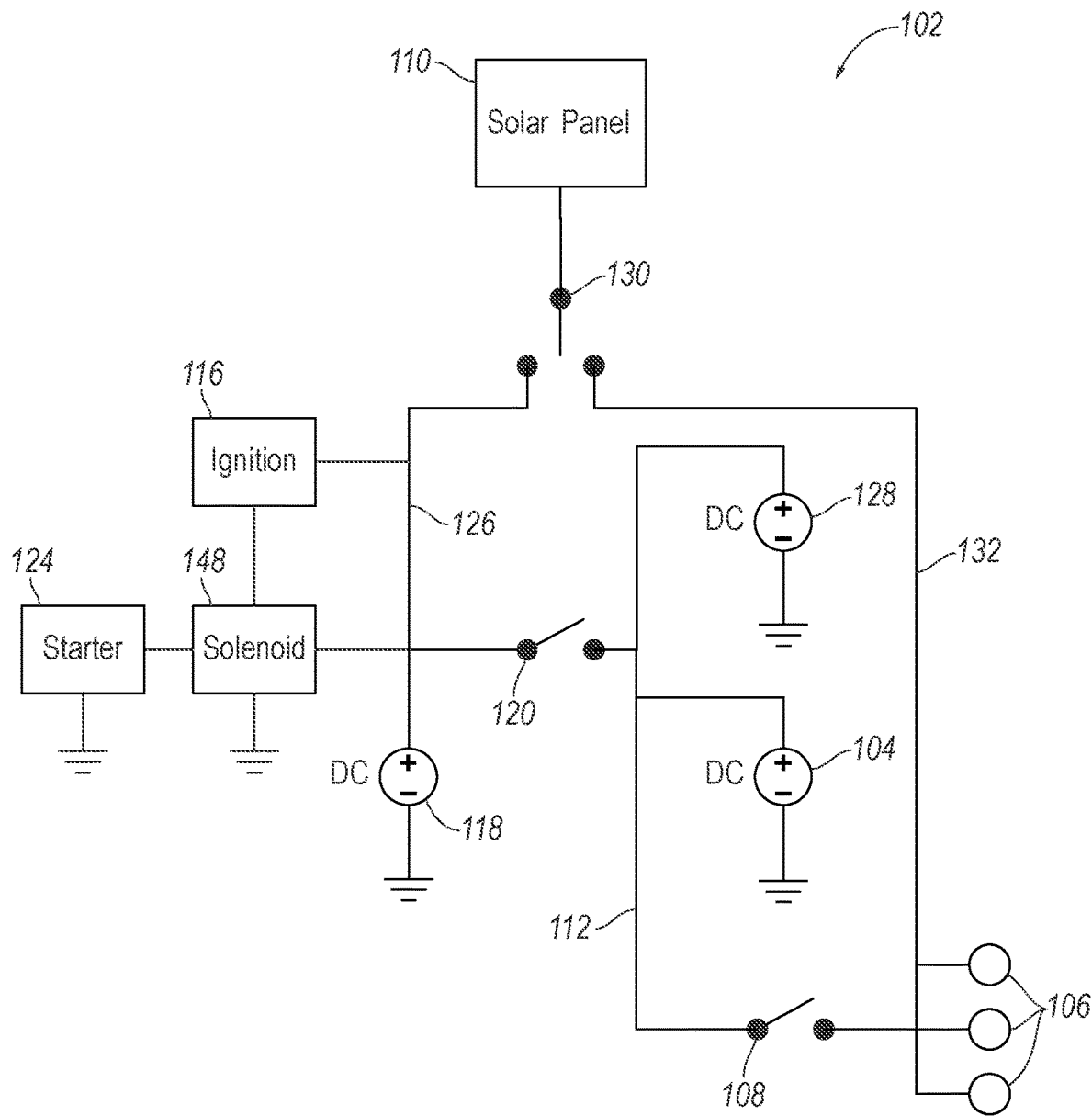
FIG. 2 is a circuit diagram of a vehicle electrical system of the vehicle.

With reference to FIG. 2, the first battery 118 may be of any suitable type for vehicular electrification, for example, lithium-ion batteries, nickel-metal hydride batteries, lead-acid batteries, or ultracapacitors, as used in, for example, internal-combustion-engine (ICE) vehicles, plug-in hybrid electric vehicles (PHEVs), hybrid electric vehicles (HEVs), or battery electric vehicles (BEVs).

The vehicle 100 includes the ignition 116. The ignition 116 can be movable by the operator between, e.g., an off state, an on state, an accessories state, and a starting state. For example, the ignition 116 can be a barrel rotatable between positions corresponding to the states, or the ignition 116 can be a push button that is in the starting state when pressed. The ignition 116 can be biased to move out of the starting position, e.g., by having a spring that rotationally biases the barrel from the starting position to the on position or biases the button from the pressed position to the unpressed position. The ignition 116 is electrically connected to the first battery 118. The first battery 118 is configured to supply power to a starter 124 in response to a signal from the ignition 116. For example, when the ignition 116 is in the starting state, the ignition 116 supplies power from the first battery 118 to a solenoid 148, causing the solenoid 148 to close and thereby complete a circuit for current to flow from the first battery 118 to the starter 124.

The starter 124 can start an engine or motor (not shown) of the vehicle 100. The starter 124 can be, e.g., an electric motor that rotates when a voltage is applied, e.g., by being electrically connected to the first battery 118.

The first switch 120 is electrically connected in series between the first battery 118 and the second battery 104, e.g., between a first node 126 at a positive terminal of the first battery 118 and the second node 112 at a positive terminal of the second battery 104. The first switch 120 is electrically connected in series between the first battery 118 and the second switch 108. For example, the first switch 120 is electrically connected in series between the first battery 118 and the second node 112, which is directly connected to the second battery 104 and the second switch 108. When the first switch 120 is closed, current is permitted to flow between the first battery 118 and the second battery 104 and second switch 108. When the first switch 120 is open, the first battery 118 is electrically isolated from the second battery 104 and second switch 108.

The first switch 120 is switchable between closed and open. For example, the first switch 120 can be a relay, i.e., an electrically operated switch. The first switch 120 can switch from open to closed or vice versa in response to a signal, e.g., from the ignition 116 or the computer 114.

The first switch 120 can be configured to be open in response to the ignition 116 being in the off state. For example, when turning off, the ignition 116 can send a signal to the first switch 120 (directly or via the computer 114) to open. The customer connection points 106 thus do not draw down the first battery 118 when the vehicle 100 is not running. The first switch 120 can be configured to be closed in response to the ignition 116 being in the on state. For example, the ignition 116 can send a signal to the first switch 120 (directly or via the computer 114) to close when the ignition 116 is released after starting the vehicle 100. The motor can thus charge the second battery 104 along with the first battery 118 when the vehicle 100 is running.

The second battery 104 may be of any suitable type for vehicular electrification, for example, lithium-ion batteries, nickel-metal hydride batteries, lead-acid batteries, or ultracapacitors, as used in, for example, internal-combustion-engine (ICE) vehicles, plug-in hybrid electric vehicles (PHEVs), hybrid electric vehicles (HEVs), or battery electric vehicles (BEVs). The second battery 104 can have a lower capacity than the first battery 118.

The vehicle 100 may include a third battery 128. The third battery 128 may be of any suitable type for vehicular electrification, for example, lithium-ion batteries, nickel-metal hydride batteries, lead-acid batteries, or ultracapacitors, as used in, for example, internal-combustion-engine (ICE) vehicles, plug-in hybrid electric vehicles (PHEVs), hybrid electric vehicles (HEVs), or battery electric vehicles (BEVs). The third battery 128 can be connected in parallel to the second battery 104. The third battery 128 can be connected at its positive terminal to the second node 112 that is directly connected to the second battery 104, the second switch 108, and the first switch 120. The third battery 128 can have a lower capacity than the first battery 118 and a capacity equal to the second battery 104.

The second switch 108 is electrically connected in series between the second battery 104 and third battery 128 and the customer connection points 106, e.g., between the second node 112 and a third node 132 at the customer connection points 106. When the second switch 108 is closed, current is permitted to flow between the second battery 104 and third battery 128 and the customer connection points 106. When the first switch 120 is open, the customer connection points 106 are electrically isolated from the second battery 104 and third battery 128.

The second switch 108 is switchable between closed and open. For example, the second switch 108 can be a relay, i.e., an electrically operated switch. The second switch 108 can switch from open to closed or vice versa in response to a signal, e.g., from the ignition 116 or the computer 114.

The vehicle electrical system 102 can include a third switch 130. The third switch 130 is electrically connected in series between the solar panel 110 and the first battery 118 and second switch 108, e.g., between the solar panel 110 and the first node 126. The third switch 130 is electrically connected in series between the solar panel 110 and the customer connection points 106, e.g., between the solar panel 110 and the third node 132.

The third switch 130 is a double-throw switch, e.g., a single-pole double-throw (SPDT) switch, switchable among (1) closed to the first battery 118, (2) closed to the customer connection points 106, and (3) open. When the third switch 130 is closed to the first battery 118, current is permitted to flow between the solar panel 110 and the first node 126, i.e., the first battery 118 and second switch 108. The solar panel 110 can thus charge the first battery 118. When the third switch 130 is closed to the customer connection point 106, current is permitted to flow between the solar panel 110 and the third node 132, i.e., the customer connection points 106. The solar panel 110 can thus provide current to nonvehicle loads 146 connected to the customer connection points 106. When the third switch 130 is open, the solar panel 110 is electrically isolated from the rest of the vehicle electrical system 102.

The third switch 130 is a relay. The third switch 130 can switch between closed to the first battery 118, closed to the customer connection points 106, and open in response to a signal, e.g., from the computer 114.

The solar panel 110 is electrically connected to the second node 112 between the second and third batteries 104, 128 and the second switch 108, e.g., indirectly connected to the second node 112 via the third switch 130 and the first switch 120. The solar panel 110 can thus charge the second battery 104 and/or third battery 128, e.g., when the third switch 130 is closed to the first battery 118 and the first switch 120 is closed.

The vehicle electrical system 102 includes at least one customer connection point 106, e.g., a plurality of customer connection points 106. The customer connection points 106 are features to which the operator can electrically connect nonvehicle loads 146, i.e., electrical loads that are not part of the vehicle 100. When the second switch 108 is open, the second battery 104 and/or third battery 128 can supply electricity to the nonvehicle loads 146 via the customer connection points 106. When the third switch 130 is closed to the customer connection points 106, the solar panel 110 can supply electricity to the nonvehicle loads 146 via the customer connection points 106.

Figure 3:
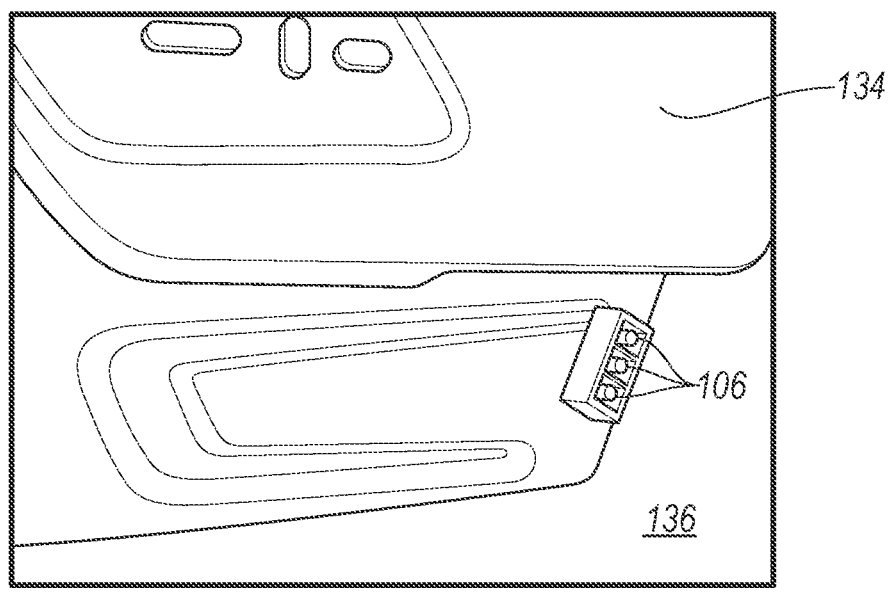
FIG. 3 is a perspective view of customer connection points of the vehicle electrical system.

With reference to FIG. 3, the customer connection points 106 can be located in a position on the vehicle 100 in which the customer connection points 106 are accessible to the operator and able to be covered when not in use. For example, the customer connection points 106 can be located at a bottom of a driver seat 134 in a passenger cabin 136 of the vehicle 100. Thus, a nonvehicle load 146 located outside the vehicle 100 can be easily electrically connected to one of the customer connection points 106.

The customer connection points 106 can be any type of feature to which a nonvehicle load 146 can be securely and temporarily attached. For example, as shown in FIG. 3, the customer connection points 106 are studs, to which the nonvehicle loads 146 can be electrically connected by clipping or screwing.

Figure 4:
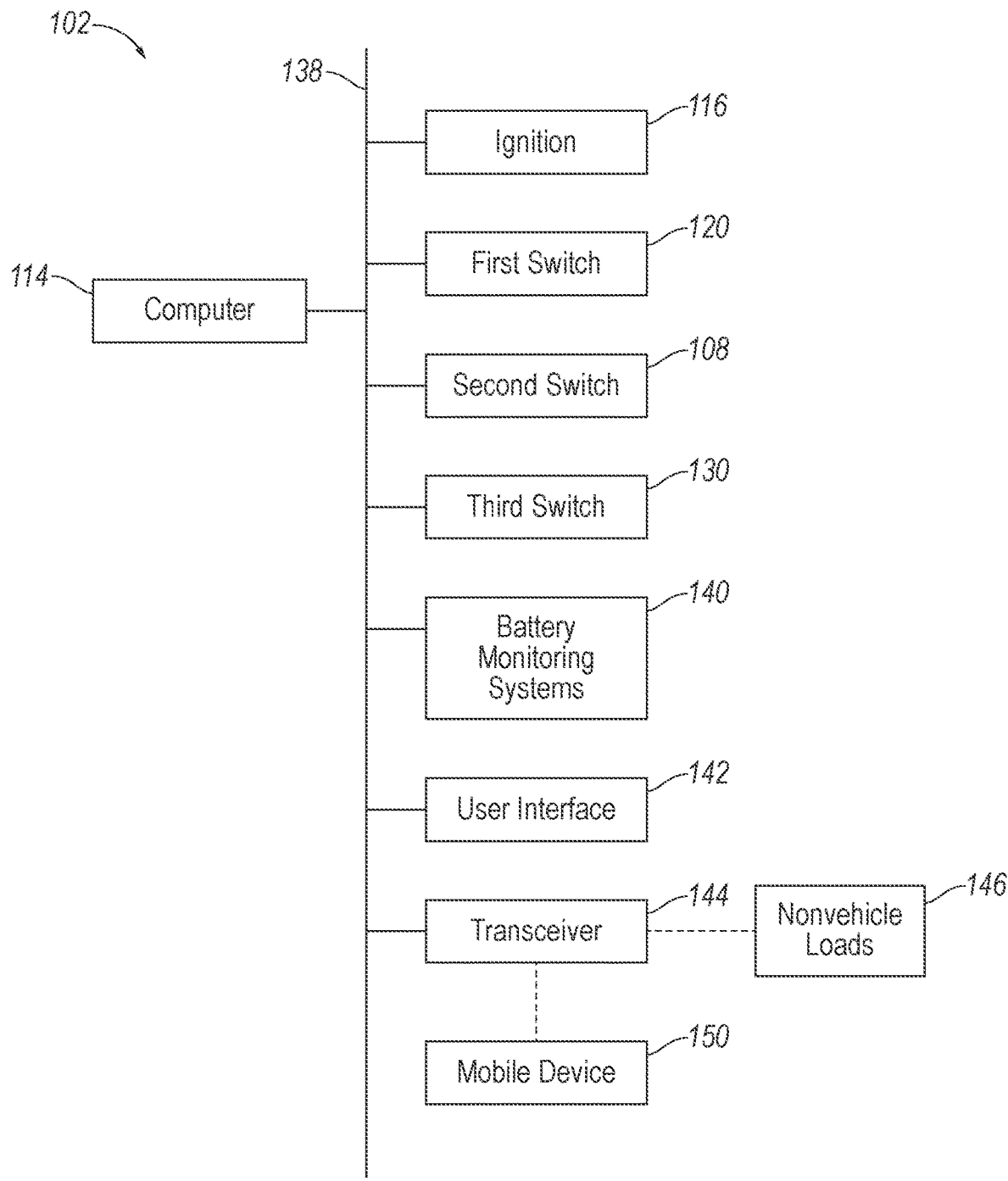
FIG. 4 is a block diagram of a control system of the vehicle electrical system.

With reference to FIG. 4, the computer 114 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 114 can thus include a processor, a memory, etc. The memory of the computer 114 can include media for storing instructions executable by the processor as well as for electronically storing data and/or databases, and/or the computer 114 can include structures such as the foregoing by which programming is provided. The computer 114 can be multiple computers coupled together.

The computer 114 may transmit and receive data through a communications network 138 such as a controller area network (CAN) bus, Ethernet, WiFi, Local Interconnect Network (LIN), onboard diagnostics connector (OBD-II), and/or by any other wired or wireless communications network. The computer 114 may be communicatively coupled to the first switch 120, the second switch 108, the third switch 130, battery monitoring systems 140, a user interface 142, a transceiver 144, and other components via the communications network 138.

The vehicle electrical system 102 can include the battery monitoring systems 140 for the first battery 118, the second battery 104, and the third battery 128. As is known, the battery monitoring systems 140 can detect voltage, current, temperature, etc. The battery monitoring systems 140 can calculate state of charge, state of health, number of cycles, etc. The state of charge is the quantity of charge remaining in a battery. The state of health is an actual condition of a battery compared to its ideal condition, e.g., capacity, voltage, internal resistance, etc.

The user interface 142 presents information to and receives information from the operator of the vehicle 100. The user interface 142 may be located, e.g., on an instrument panel in the passenger cabin 136 of the vehicle 100, or wherever may be readily seen by the operator. The user interface 142 may include dials, digital readouts, screens, speakers, and so on for providing information to the operator, e.g., human-machine interface (HMI) elements such as are known. The user interface 142 may include buttons, knobs, keypads, microphone, and so on for receiving information from the operator.

The transceiver 144 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 144 may be adapted to communicate with one or more remote servers, that is, servers distinct and spaced from the vehicle 100. The remote servers may be located outside the vehicle 100. For example, the remote servers may be associated with another vehicle (e.g., V2V communications), an infrastructure component (e.g., V2I communications), an emergency responder, a mobile device 150 associated with the operator of the vehicle 100, the nonvehicle loads 146, etc. The transceiver 144 may be one device or may include a separate transmitter and receiver.

The mobile device 150 is a portable computing device such as a mobile phone, e.g., a smartphone, or a tablet. The mobile device 150 is a computing device including a processor and a memory. The mobile device 150 is associated with the vehicle 100, e.g., is owned and carried by a person who may be the operator or owner of the vehicle 100.

Some nonvehicle loads 146 can be remote servers that can communicate with the transceiver 144. In particular, some nonvehicle loads 146 can communicate with the transceiver 144 via Bluetooth® Low Energy (BLE). The nonvehicle loads 146 can monitor their power-consumption data, e.g., their own current draw, charge used, voltage drop, etc., as is known, and transmit that power-consumption data to the computer 114 via the transceiver 144. The power-consumption data includes individual rates of power consumption of the nonvehicle loads 146.

The vehicle electrical system 102 can open the second switch 108 in response to a state of charge of the second battery 104 and/or third battery 128 decreasing below a charge threshold, thus isolating the customer connection points 106 from the second and third batteries 104, 128. The charge threshold can be chosen to prevent the second battery 104 and/or third battery 128 from experiencing a deep discharge that may diminish a capacity of the second battery 104 and/or third battery 128. In addition to opening the second switch 108, the vehicle electrical system 102 can also start the ignition 116 of the vehicle 100 in response to the state of charge of the second battery 104 and/or third battery 128 decreasing below the charge threshold, permitting the second battery 104 and/or third battery 128 to be recharged by the motor of the vehicle 100 (not shown).

The vehicle electrical system 102 can instruct the transceiver 144 to transmit a message to the operator at one or more time limits before the second switch 108 disconnects the customer connection points 106 from the second and third batteries 104, 128. The time limits can include a first time limit and a second time limit, both described below. The message can be provided via the user interface 142 and/or the transceiver 144 and the mobile device 150. The message permits the operator to take some action before a nonvehicle load 146 connected to one of the customer connection points 106 loses power from the second and third batteries 104, 128, e.g., starting the vehicle 100 to charge the second battery 104 and/or third battery 128, turning off the nonvehicle load 146, etc.

To determine when to transmit the message, the computer 114 determines a rate of discharge and a time to reach the charge threshold. The rate of discharge can be an electrical current detected by the battery monitoring systems 140 flowing to the customer connection points 106. The computer 114 can apply a rolling average to the electrical current to account for fluctuations in the electrical current. Alternatively or additionally, the rate of discharge can be determined based on data from the nonvehicle loads 146, e.g., by summing individual current draws of the nonvehicle loads 146. The time to reach the charge threshold is the rate of discharge divided by the difference between the state of charge and the charge threshold, i.e., $T=R/(SOC-Q_{th})$, in which T is the time to reach the charge threshold, R is the rate of discharge, SOC is the state of charge of the second battery 104 and/or third battery 128, and $Q_{th}$ is the charge threshold. The state of charge SOC can be detected by the battery monitoring systems 140. The time T to reach the charge threshold can also be based on a projected rate of discharge, e.g., if the data from the nonvehicle loads 146 indicates that the current draw of one or more of the nonvehicle loads 146 will increase at a future time. When the time T to reach the charge threshold decreases to equal one of the time limits, the computer 114 instructs the transceiver 144 to transmit the message to the remote server, e.g., the mobile device 150.

The first time limit can be selected by the operator and provided as an input to the computer 114, e.g., via the user interface 142 and/or the mobile device 150 and transceiver 144. The user interface 142 and/or mobile device 150 can display a range from a smallest time to a largest time, and the operator can select the first time limit from the range, e.g., by selecting one of a plurality of discrete times such as 2 hours, 3 hours, 4 hours, etc. or by typing in a value of the first time limit that is within the range. Because the time limit can be selected by the operator, the time limit can permit the operator sufficient time to start the vehicle 100 or prepare for disconnection.

The second time can be predetermined and stored in the memory of the computer 114. The second time limit can be chosen to notify the operator that disconnection of the customer connection points 106 is imminent, e.g., 5 minutes. The second time limit can be smaller than the first time limit, e.g., smaller than the smallest time of the range of possible first time limits.

The vehicle electrical system 102 can instruct the transceiver 144 to transmit a message to the operator and selectively shut down the nonvehicle loads 146 upon predicting that the second battery 104 or third battery 128 will discharge to the charge threshold before a target time. The target time can be a time through which the operator expects to continue powering the nonvehicle loads 146. The target time can be selected by the operator and provided as an input to the computer 114, e.g., via the user interface 142 and/or the mobile device 150 and transceiver 144. The user interface 142 and/or mobile device 150 can display a range from an earliest time to a latest time, and the operator can select the target time from the range, e.g., by selecting one of a plurality of discrete times such as 2 hours from the current time, 7:00 AM (i.e., overnight), etc. or by typing in a value of the target time. The computer 114 can predict that the second battery 104 or third battery 128 will discharge to the charge threshold before the target time by, e.g., determining that the time to reach the charge threshold is less than a duration from current time to the target time.

Upon predicting that the second battery 104 or third battery 128 will discharge to the charge threshold before the target time, the computer 114 can select a subset of the nonvehicle loads 146 electrically coupled to the customer connection points 106 to shut down based on the power-consumption data received from the nonvehicle loads 146. For example, the computer 114 can select the subset of the nonvehicle loads 146 so that, given the remaining nonvehicle loads 146, i.e., the nonvehicle loads 146 not in the subset, i.e., the nonvehicle loads 146 that will remain on, the time to reach the charge threshold becomes greater than the duration from the current time to the target time.

The computer 114 can select the subset of the nonvehicle loads 146 electrically coupled to the customer connection points 106 to shut down based on, e.g., based additionally on, a prioritization of the nonvehicle loads 146 received as an input. The input can be a sorting of nonvehicle loads 146 into ordered tiers, e.g., a first tier, a second tier, etc. The subset of the nonvehicle loads 146 can include as many tiers in order as will have generate a time to reach the charge threshold that is greater than the duration from the current time to the target time; e.g., the subset includes the nonvehicle loads 146 in the first and second tiers if the first and second tiers have a time to reach the charge threshold greater than the duration from the current time to the target time and the first, second, and third tiers have a time to reach the charge threshold less than the duration from the current time to the target time. The time to reach the charge threshold for each collection of tiers can be determined using the power-consumption data from the nonvehicle loads 146. For a specific example, the sorting of the nonvehicle loads 146 into tiers can be a ranking of the nonvehicle loads 146, i.e., each tier has a single nonvehicle load 146.

Figure 5:
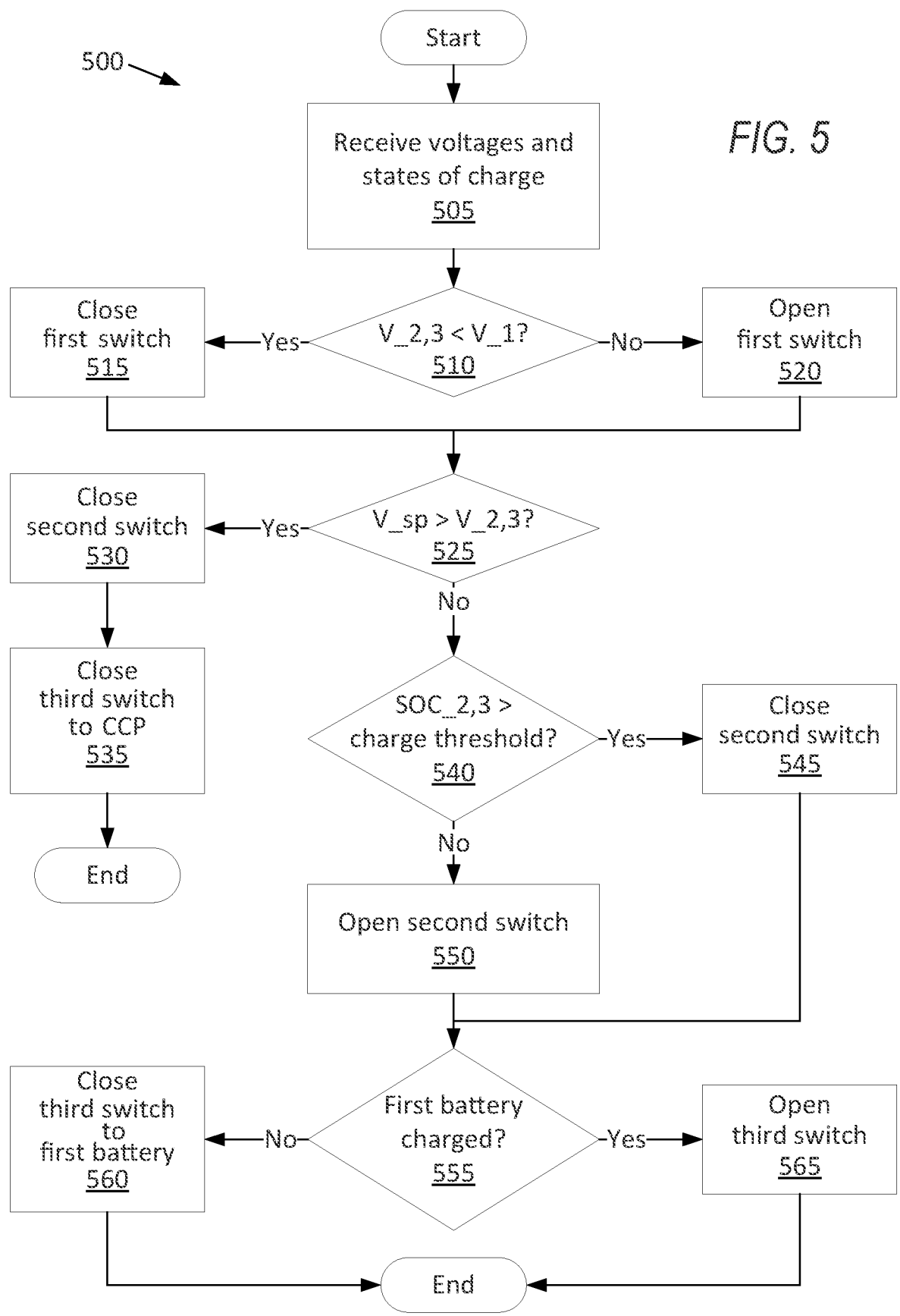
FIG. 5 is a process flow diagram of an example process for controlling the vehicle electrical system.

FIG. 5 is a process flow diagram illustrating an exemplary process 500 for controlling the vehicle electrical system 102 by setting the switches 108, 120, 130. The memory of the computer 114 stores executable instructions for performing the steps of the process 500 and/or programming can be implemented in structures such as mentioned above. As a general overview of the process 500, the computer 114 receives the voltage of the solar panel 110 and the voltages and/or states of charge of the first battery 118, second battery 104, and/or third battery 128. If the voltage of the first battery 118 is less than the voltages of the second battery 104 and/or third battery 128, the computer 114 instructs the first switch 120 to close; otherwise, the computer 114 instructs the first switch 120 to open. If the voltage of the solar panel 110 is greater than the voltages of the second battery 104 or third battery 128, the computer 114 instructs the second switch 108 to close and instructs the third switch 130 to close to the customer connection points 106. If the state of charge of the second battery 104 and/or third battery 128 is greater than the charge threshold, the computer 114 instructs the second switch 108 to close; otherwise, the computer 114 instructs the second switch 108 to open. If the first battery 118 is fully charged, the computer 114 instructs the third switch 130 to open; otherwise, the computer 114 instructs the third switch 130 to close to the first battery 118.

The process 500 begins in a block 505, in which the computer 114 receives the voltage of the solar panel 110 and the voltages and states of charge of the first battery 118, the second battery 104, and the third battery 128, e.g., from the battery monitoring systems 140.

Next, in a decision block 510, the computer 114 determines whether the voltages of the second battery 104 and/or third battery 128 are less than the voltage of the first battery 118. Upon determining that the voltage of the second battery 104 or third battery 128 is less than the voltage of the first battery 118, the process 500 proceeds to a block 515. Upon determining that the voltage of the second battery 104 or third battery 128 is at least equal to the voltage of the first battery 118, the process 500 proceeds to a block 520.

In the block 515, the computer 114 instructs the first switch 120 to close. The second battery 104 and third battery 128 are sufficiently charged that the first battery 118 will not be drawn down charging the second battery 104 and/or third battery 128 even though connected. After the block 515, the process 500 proceeds to a decision block 525.

In the block 520, the computer 114 instructs the first switch 120 to open. The open circuit prevents the second battery 104 and/or third battery 128 from drawing down the first battery 118. The charge of the first battery 118 is thus preserved for powering the starter 124 to start the motor. After the block 520, the process 500 proceeds to the decision block 525.

In the decision block 525, the computer 114 determines whether the voltage of the solar panel 110 is greater than the voltage of the second battery 104 and/or third battery 128. Upon determining that the voltage of the solar panel 110 is greater than the voltage of the second battery 104 and/or third battery 128, the process 500 proceeds to a block 530. Upon determining that the voltage of the solar panel 110 is less than the voltage of the second battery 104 and/or third battery 128, the process 500 proceeds to a decision block 540.

In the block 530, the computer 114 instructs the second switch 108 to close.

Next, in a block 535, the computer 114 instructs the third switch 130 to close to the customer connection points 106. With the second switch 108 closed and the third switch 130 closed to the customer connection points 106, the solar panel 110 provides current to the nonvehicle loads 146 and may also charge the second battery 104 and/or third battery 128. After the block 535, the process 500 ends.

In the decision block 540, the computer 114 determines whether the state of charge of the second battery 104 and/or third battery 128 is above the charge threshold. Upon determining that the state of charge of the second battery 104 and/or third battery 128 is above the charge threshold, the process 500 proceeds to a block 545. Upon determining that the state of charge of the second battery 104 and/or third battery 128 is below the charge threshold, the process 500 proceeds to a block 550.

In the block 545, the computer 114 instructs the second switch 108 to close. The second and third batteries 104, 128 can provide current to the nonvehicle loads 146. After the block 545, the process 500 proceeds to a decision block 555.

In the block 550, the computer 114 instructs the second switch 108 to open, isolating the customer connection points 106 from the second and third batteries 104, 128. After the block 550, the process 500 proceeds to a decision block 555.

In the decision block 555, the computer 114 determines whether the state of charge of the first battery 118 is fully charged. Upon determining that the state of charge of the first battery 118 is less than fully charged, the process 500 proceeds to a block 560. Upon determining that the state of charge of the first battery 118 is fully charged, the process 500 proceeds to a block 565.

In the block 560, the computer 114 instructs the third switch 130 to close to the first battery 118. The solar panel 110 can thus charge the first battery 118. After the block 560, the process 500 ends.

In the block 565, the computer 114 instructs the third switch 130 to open. The first battery 118 is thus isolated from the solar panel 110 and is prevented from overcharging. After the block 565, the process 500 ends.

Figure 6:
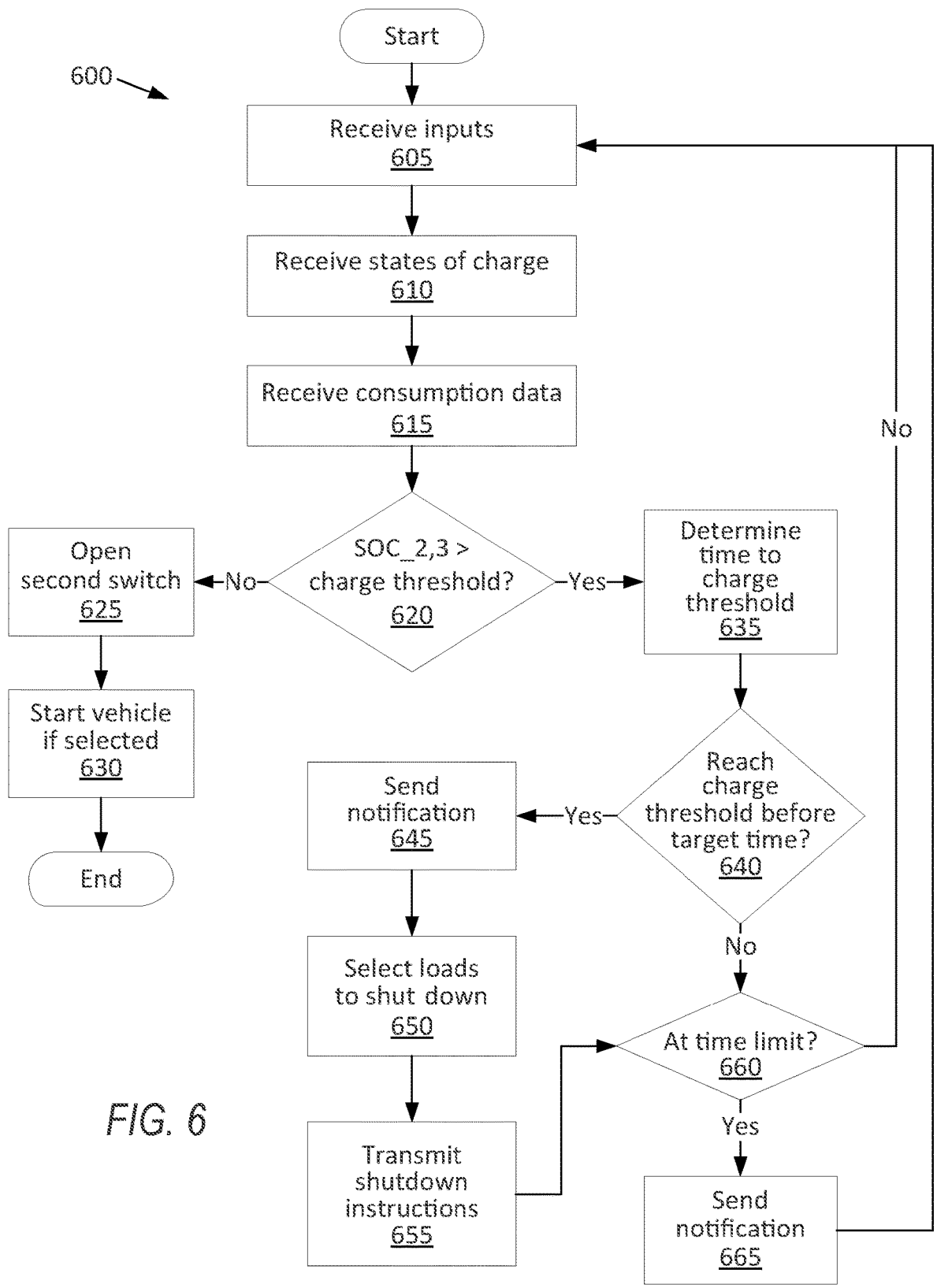
FIG. 6 is a process flow diagram of another example process for controlling the vehicle electrical system.

FIG. 6 is a process flow diagram illustrating an exemplary process 600 for controlling the vehicle electrical system 102 by managing the nonvehicle loads 146. The memory of the computer 114 stores executable instructions for performing the steps of the process 600 and/or programming can be implemented in structures such as mentioned above. As a general overview of the process 600, the computer 114 receives inputs of settings for controlling the vehicle electrical system 102. The computer 114 receives the states of charge of the first battery 118, the second battery 104, and the third battery 128 and the power-consumption data from the nonvehicle loads 146. If the state of charge of the second battery 104 and/or third battery 128 decreases below the charge threshold, the computer 114 instructs the second switch 108 to open and, if selected by the operator, starts the ignition 116 of the vehicle 100. If the state of charge is still above the charge threshold, the computer 114 determines the rate of discharge and the time to reach the charge threshold. Upon predicting that the second battery 104 and/or third battery 128 will discharge to the charge threshold before the target time, the computer 114 instructs the transceiver 144 to transmit a message to the remote server, e.g., the mobile device 150, selects the subset of the nonvehicle loads 146, and instructs the nonvehicle loads 146 in the subset to shut down. If the time to reach the charge threshold falls below the first time limit or the second time limit, the computer 114 instructs the transceiver 144 to transmits a message to the remote server, e.g., the mobile device 150. The process 600 repeats while the state of charge remains above the charge threshold.

The process 600 begins in a block 605, in which the computer 114 receives inputs of settings for the vehicle electrical system 102. One of the inputs can select the first time limit. The input can contain a selection of the first time limit from the range from the smallest time to the greatest time, as described above. Another of the inputs can select whether to start the ignition 116 in response to the state of charge of the second battery 104 or third battery 128 decreasing below the charge threshold, i.e., whether the computer 114 starts the ignition 116 or refrains from starting the ignition 116 in a block 630 below. Another of the inputs selects the target time, as described above. Another of the inputs is the prioritization of the nonvehicle loads 146, as described above. The computer 114 can receive the inputs from the user interface 142 and/or can receive the inputs from the remote server, e.g., the mobile device 150, via the transceiver 144.

Next, in a block 610, the computer 114 receives the states of charge of the second battery 104 and the third battery 128 from the battery monitoring system 140.

Next, in a block 615, the computer 114 receives the power-consumption data from the nonvehicle loads 146 via the transceiver 144, as described above.

Next, in a decision block 620, the computer 114 determines whether the state of charge of the second battery 104 or third battery 128 decreased below the charge threshold, as described above. In response to the state of charge decreasing below the charge threshold, the process 600 proceeds to a block 625. If the state of charge is still above the charge threshold, the process 600 proceeds to a block 635.

In the block 625, the computer 114 instructs the second switch 108 to open, isolating the customer connection points 106 from the second and third batteries 104, 128.

Next, in a block 630, the computer 114 starts the ignition 116 if the input received in the block 605 selected to do so. If the input did not select to start the ignition 116, the computer 114 refrains from starting the ignition 116. After the block 630, the process 600 ends.

In the block 635, the computer 114 determines the rate of discharge and the time to reach the charge threshold, as described above.

Next, in a decision block 640, the computer 114 predicts whether the second battery 104 and/or third battery 128 will discharge to the charge threshold before the target time, as described above. Upon predicting that the second battery 104 and/or third battery 128 will discharge to the charge threshold before the target time, the process 600 proceeds to a block 645. Upon predicting that the second battery 104 and/or third battery 128 will discharge to the charge threshold after the target time, the process 600 proceeds to a decision block 660.

In the block 645, the computer 114 instructs the transceiver 144 to transmit a message to the remote server, e.g., the mobile device 150, indicating that the second battery 104 or third battery 128 will discharge to the charge threshold before the target time.

Next, in a block 650, the computer 114 selects the subset of the nonvehicle loads 146 to shut down based on the power-consumption data and/or the prioritization of the nonvehicle loads 146, as described above.

Next, in a block 655, the computer 114 transmits instructions to the subset of the nonvehicle loads 146 to shut down, e.g., wirelessly with the transceiver 144 via BLE, as described above. After the block 655, the process 600 proceeds to the decision block 660.

In the decision block 660, the computer 114 determines whether the state of charge of the second battery 104 and/or third battery 128 will decrease below the charge threshold in less than the first or second time limit from the current time, i.e., whether the time to reach the charge threshold determined in the block 635 has fallen below the first or second time limit. Upon determining that the state of charge of the second battery 104 and/or third battery 128 will decrease below the charge threshold in less than the first or second time limit, the process 600 proceeds to a block 665. If the state of charge will decrease below the charge threshold in a greater time than the first or second time limit (or the message in the block 665 has already been sent for the respective first or second time limit), the process 600 returns to the block 605 to continue monitoring the second battery 104 and third battery 128.

In the block 665, the computer 114 instructs the transceiver 144 to transmit a message to the remote server, e.g., the mobile device 150, indicating that the second battery 104 and/or third battery 128 will reach the charge threshold within the respective time limit from the current time. After the block 665, the process 600 returns to the block 605 to continue monitoring the second battery 104 and third battery 128.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship. The adjectives "first," "second," and "third" are used throughout this document as identifiers and are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle electrical system comprising:
a first battery;
an ignition electrically connected to the first battery, wherein the first battery is configured to supply power to a starter in response to a signal from the ignition;
a second battery;
a customer connection point, wherein the customer connection point is a feature to which a nonvehicle load is electrically connectable;
a first switch electrically connected in series between the first battery and the second battery;
a second switch electrically connected in series between the second battery and the customer connection point;
a solar panel electrically connected to a node between the second battery and the second switch; and
a computer communicatively coupled to the second switch, the computer being programmed to instruct the second switch to close upon determining that a voltage of the solar panel is greater than a voltage of the second battery.

2. The vehicle electrical system of claim 1, wherein the computer is further programmed to instruct the first switch to close upon determining that the voltage of the second battery is less than a voltage of the first battery.

3. The vehicle electrical system of claim 1, wherein the computer is further programmed to instruct the first switch to open upon determining that the voltage of the second battery is at least equal to a voltage of the first battery.

4. The vehicle electrical system of claim 1, wherein the first switch is electrically connected in series between the first battery and the second switch.

5. The vehicle electrical system of claim 1, further comprising a third switch, wherein the third switch is a double-throw switch switchable among (1) closed to the first battery, (2) closed to the customer connection point, and (3) open.

6. The vehicle electrical system of claim 5, wherein the computer is further programmed to instruct the third switch to close to the customer connection point upon determining that the voltage of the solar panel is greater than the voltage of the second battery.

7. The vehicle electrical system of claim 5, wherein the computer is further programmed to instruct the third switch to close to the first battery upon determining that a state of charge of the first battery is less than fully charged.

8. The vehicle electrical system of claim 5, wherein the computer is further programmed to instruct the third switch to open upon determining both that the voltage of the solar panel is less than the voltage of the second battery and that a state of charge of the first battery is fully charged.

9. The vehicle electrical system of claim 1, wherein the computer is further programmed to instruct the second switch to close upon determining that a state of charge of the second battery is above a charge threshold.

10. The vehicle electrical system of claim 1, wherein the computer is further programmed to instruct the second switch to open upon determining that a state of charge of the second battery is below a charge threshold.

11. The vehicle electrical system of claim 1, wherein the computer is further programmed to instruct the second switch to open upon determining both that the voltage of the solar panel is greater than the voltage of the second battery and that a state of charge of the second battery is below a charge threshold.

12. The vehicle electrical system of claim 1, further comprising a plurality of customer connection points including the customer connection point, wherein the second switch is electrically connected in series between the second battery and the plurality of customer connection points.

13. The vehicle electrical system of claim 12, wherein the computer is further programmed to receive an input selecting a target time, select a subset of a plurality of nonvehicle loads electrically coupled to the customer connection points upon predicting that the second battery will discharge to a charge threshold before the target time, and then transmit instructions to the subset of the nonvehicle loads to shut down.

14. A vehicle electrical system comprising:
a battery;
a plurality of customer connection points, wherein the customer connection points are features to which nonvehicle loads are electrically connectable;
a switch electrically connected in series between the battery and the plurality of customer connection points;
a solar panel electrically connected to a node between the battery and the switch; and
a computer communicatively coupled to the switch, the computer being programmed to:
instruct the switch to close upon determining that a voltage of the solar panel is greater than a voltage of the battery;
receive an input selecting a target time;
select a subset of a plurality of loads electrically coupled to the customer connection points upon predicting that the battery will discharge to a charge threshold before the target time; and
then transmit instructions to the subset of the loads to shut down.

15. The vehicle electrical system of claim 14, wherein selecting the subset of the nonvehicle loads is based on power-consumption data received from the nonvehicle loads.

16. The vehicle electrical system of claim 15, further comprising a wireless transceiver communicatively coupled to the computer, wherein the computer is further programmed to receive the power-consumption data from the nonvehicle loads via the wireless transceiver.

17. The vehicle electrical system of claim 15, wherein the power-consumption data includes individual rates of power consumption of the nonvehicle loads.

18. The vehicle electrical system of claim 14, further comprising a transceiver communicatively coupled to the computer, wherein the computer is further programmed to instruct the transceiver to transmit a message to a remote server upon predicting that the battery will discharge to the charge threshold before the target time.

19. A vehicle electrical system comprising:
a first battery;
a second battery;
a customer connection point, wherein the customer connection point is a feature to which a nonvehicle load is electrically connectable;
a first switch electrically connected in series between the first battery and the second battery;
a second switch electrically connected in series between the second battery and the customer connection point;
a solar panel electrically connected to a node between the second battery and the second switch; and
a computer communicatively coupled to the second switch, the computer being programmed to:
instruct the second switch to close upon determining that a voltage of the solar panel is greater than a voltage of the second battery; and
instruct the first switch to close upon determining that the voltage of the second battery is less than a voltage of the first battery.

20. The vehicle electrical system of claim 14, wherein selecting the subset of the nonvehicle loads is based on a prioritization of the nonvehicle loads received as an input.

* * * * *